Nov. 28, 1939.    J. V. CAPUTO    2,181,652
ELECTRIC WELDING MACHINE
Filed Aug. 14, 1930    12 Sheets-Sheet 1

INVENTOR
James V. Caputo
by his attorneys
Byrnes, Stebbins, Parmelee & Blenko

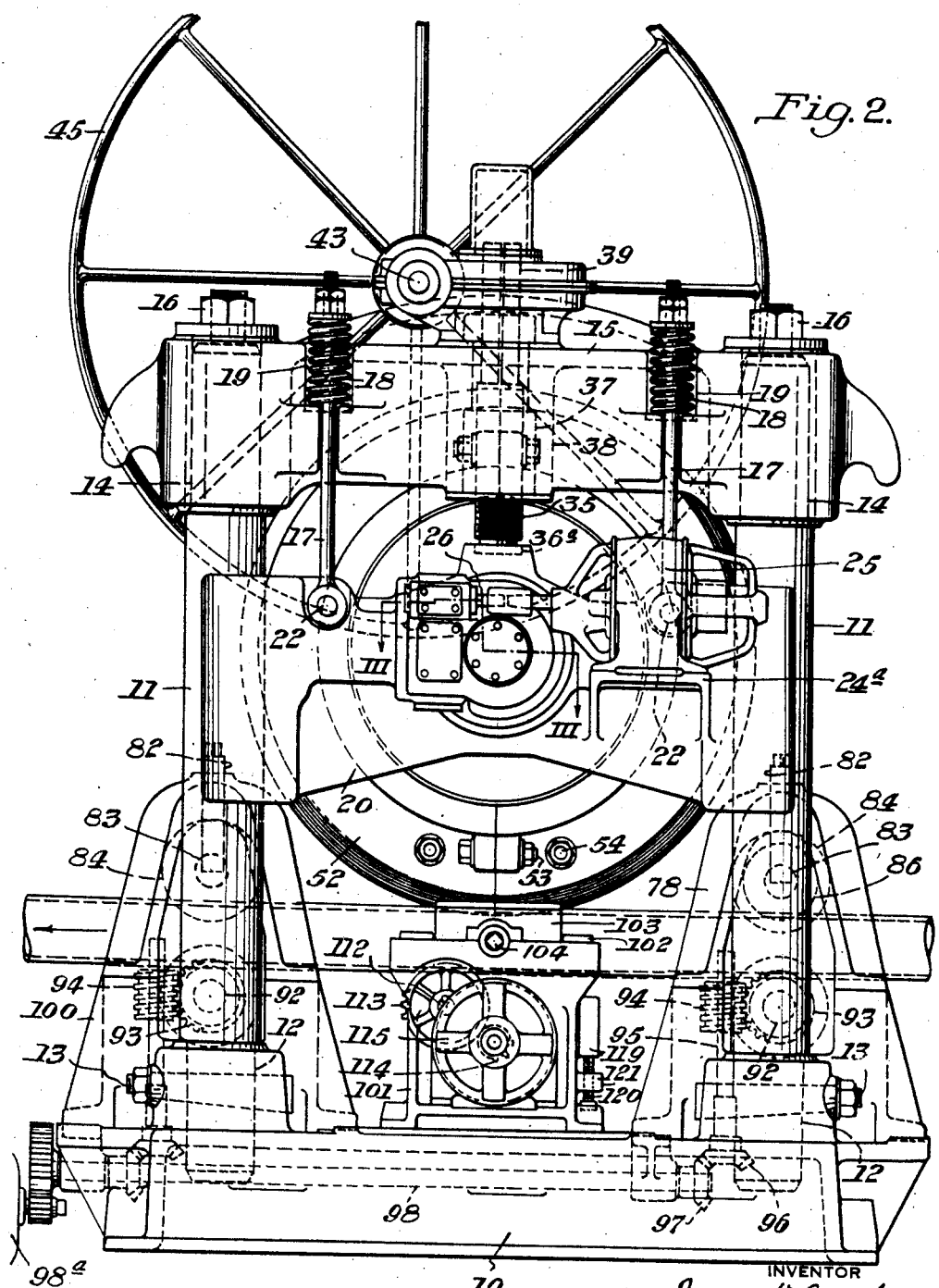

Nov. 28, 1939.                J. V. CAPUTO                2,181,652
                        ELECTRIC WELDING MACHINE
                    Filed Aug. 14, 1930        12 Sheets-Sheet 3
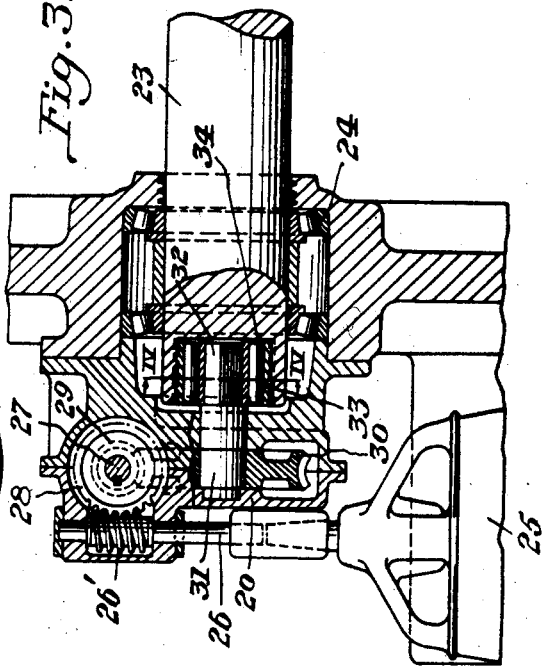
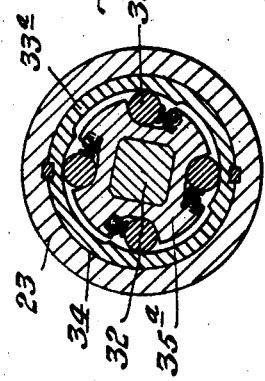
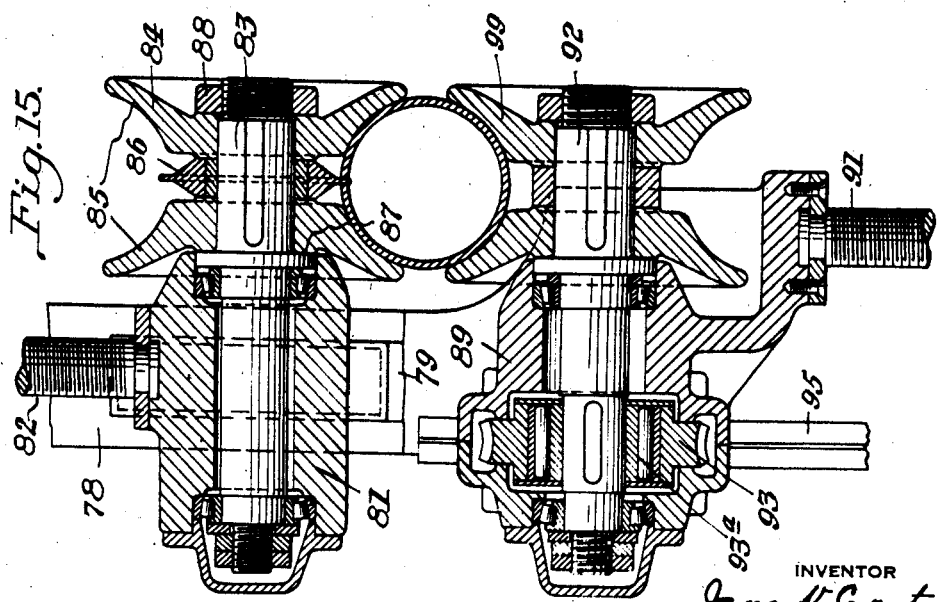

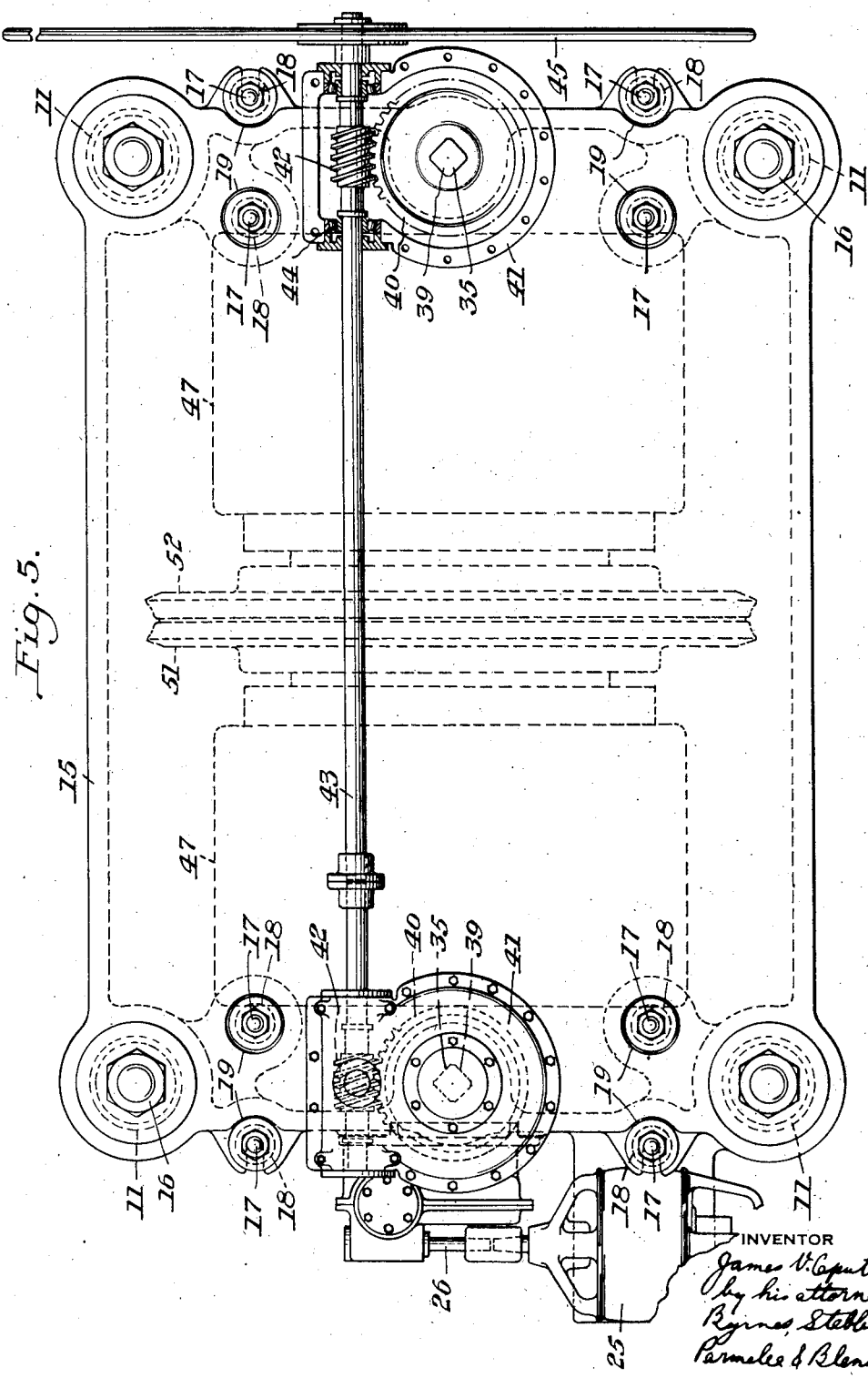

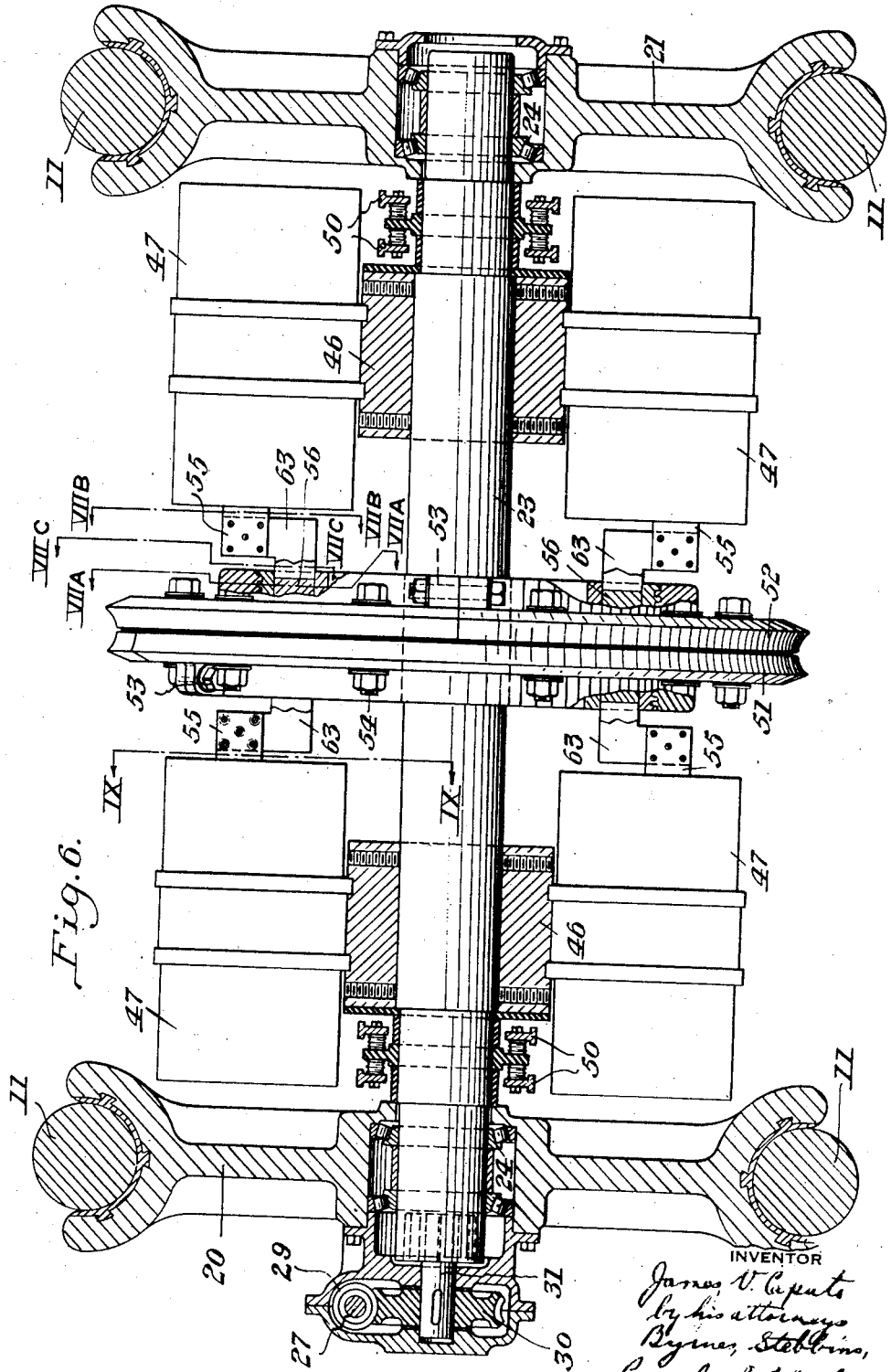

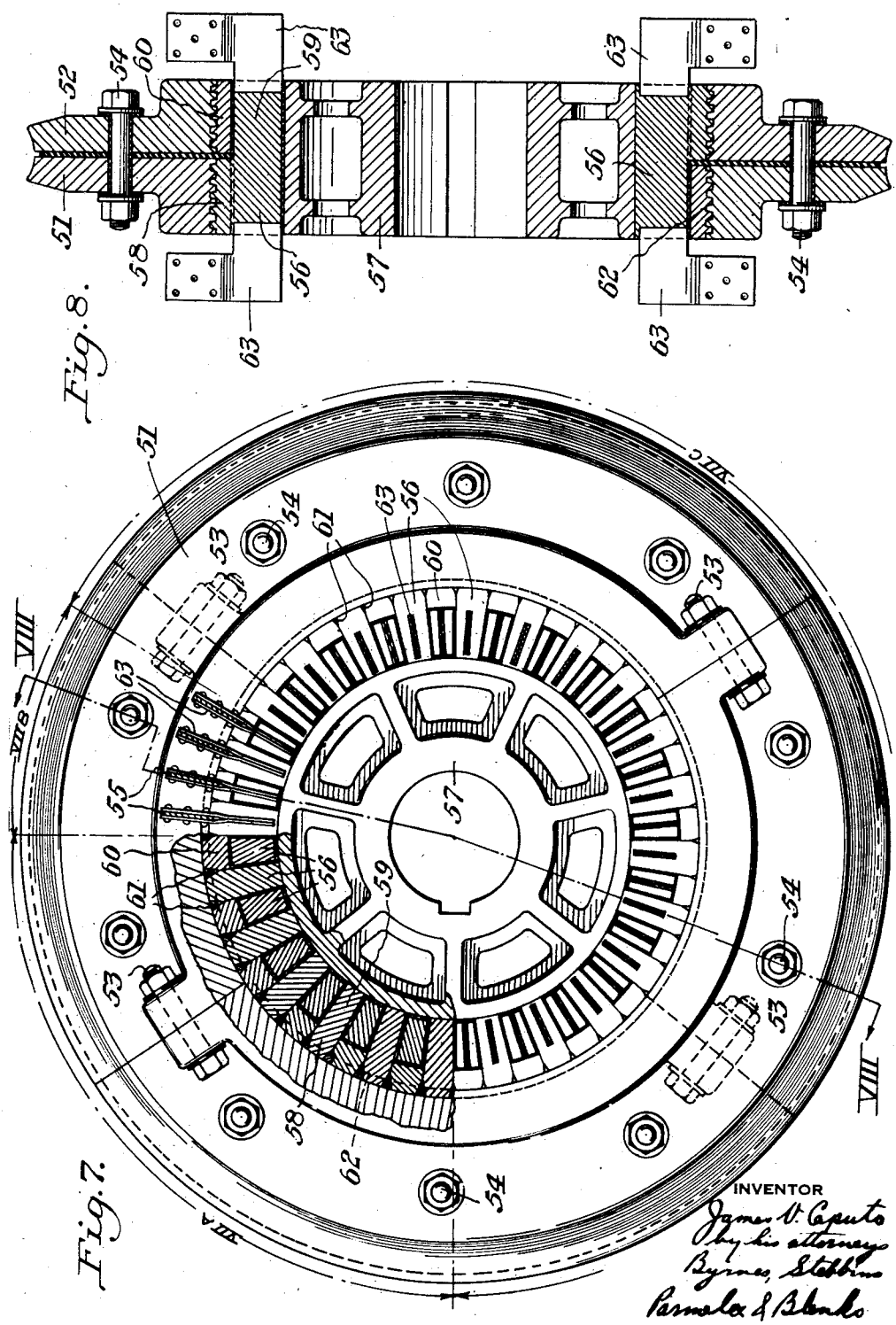

Nov. 28, 1939.     J. V. CAPUTO     2,181,652
ELECTRIC WELDING MACHINE
Filed Aug. 14, 1930     12 Sheets-Sheet 7

INVENTOR
James V. Caputo
By his attorneys
Byrne, Stebbins, Parmelee & Blenko

Nov. 28, 1939.                    J. V. CAPUTO                    2,181,652
                            ELECTRIC WELDING MACHINE
                        Filed Aug. 14, 1930        12 Sheets-Sheet 8
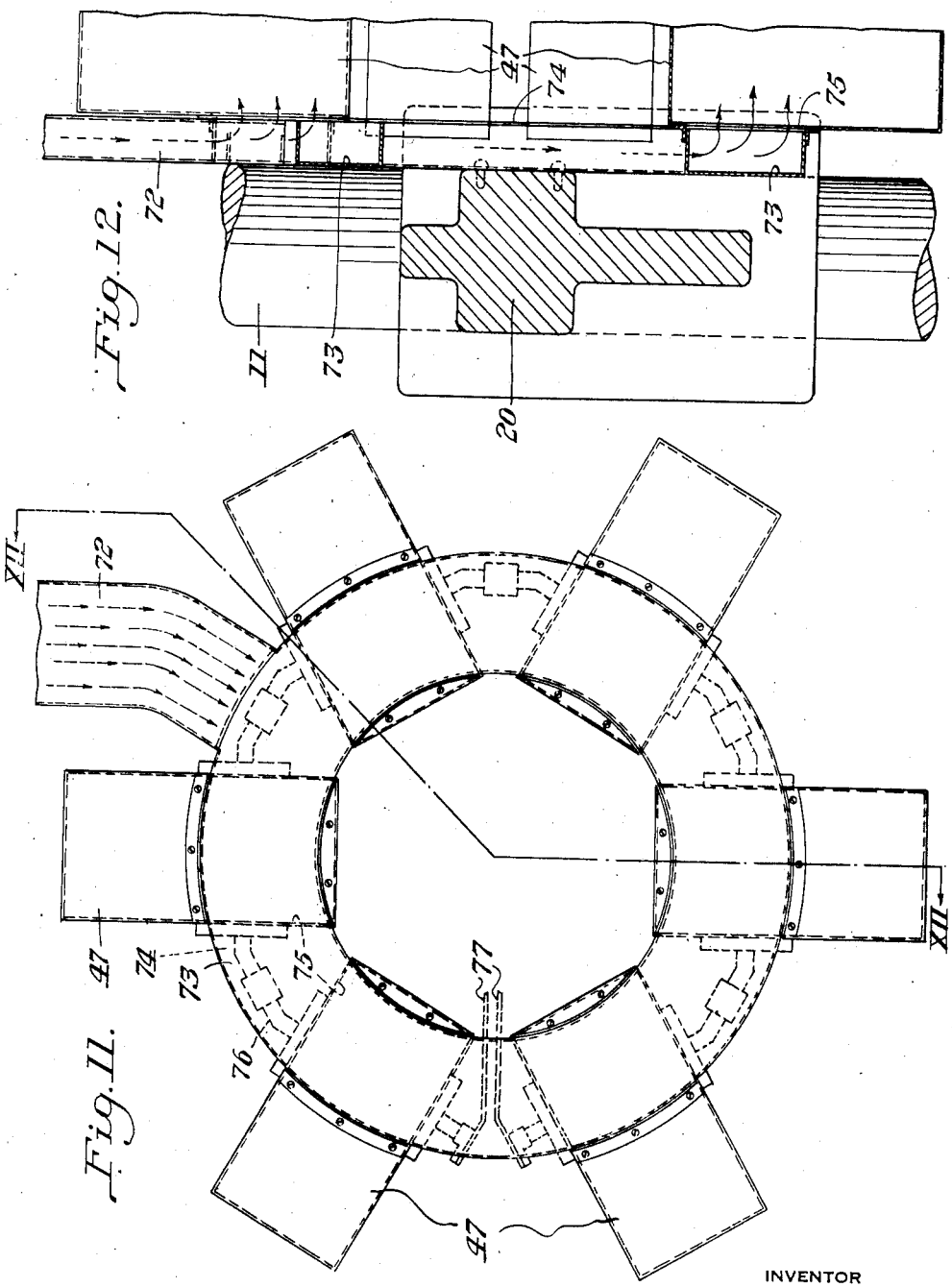
INVENTOR
James V. Caputo
by his attorneys
Byrnes, Stebbins, Parmelee & Blenko

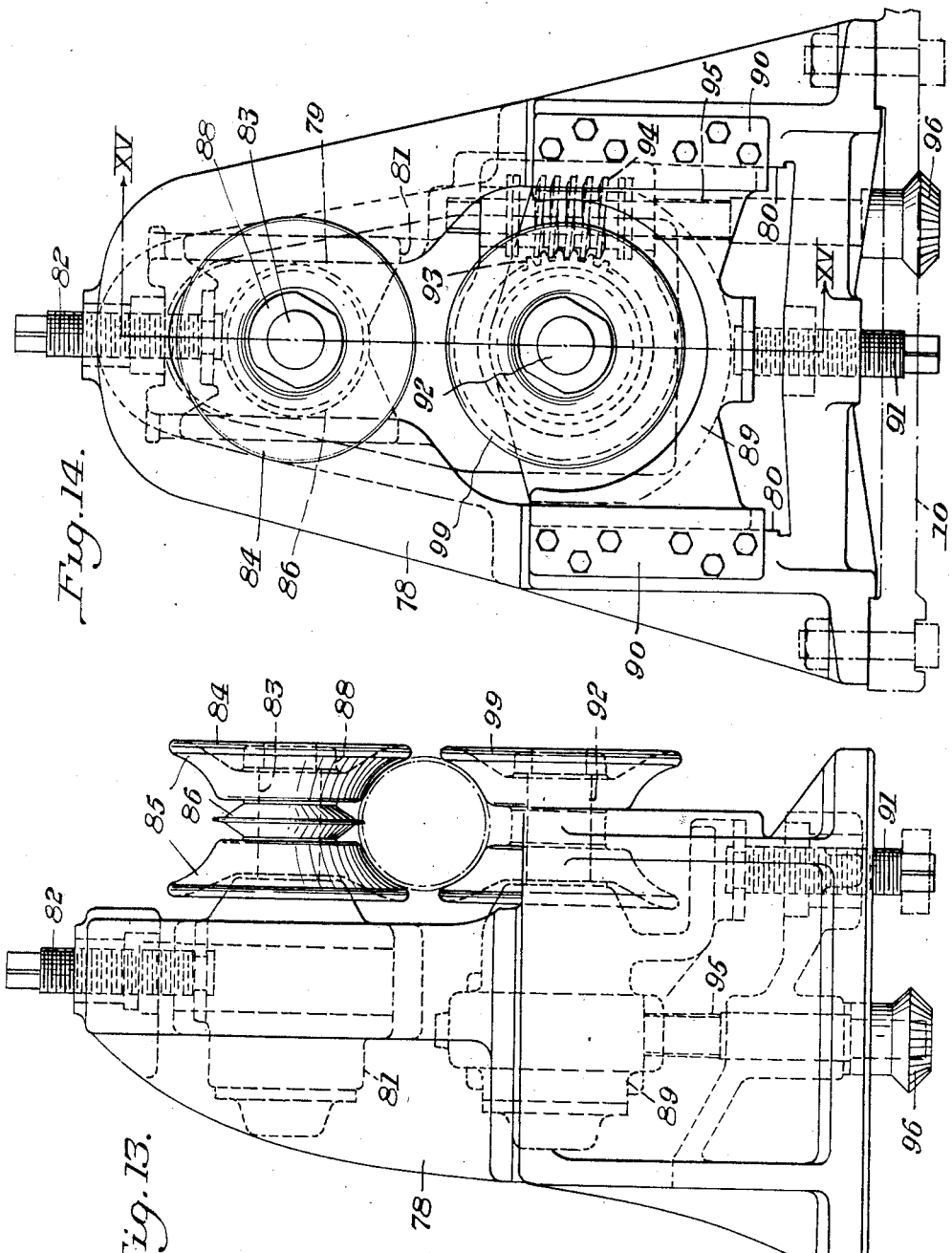

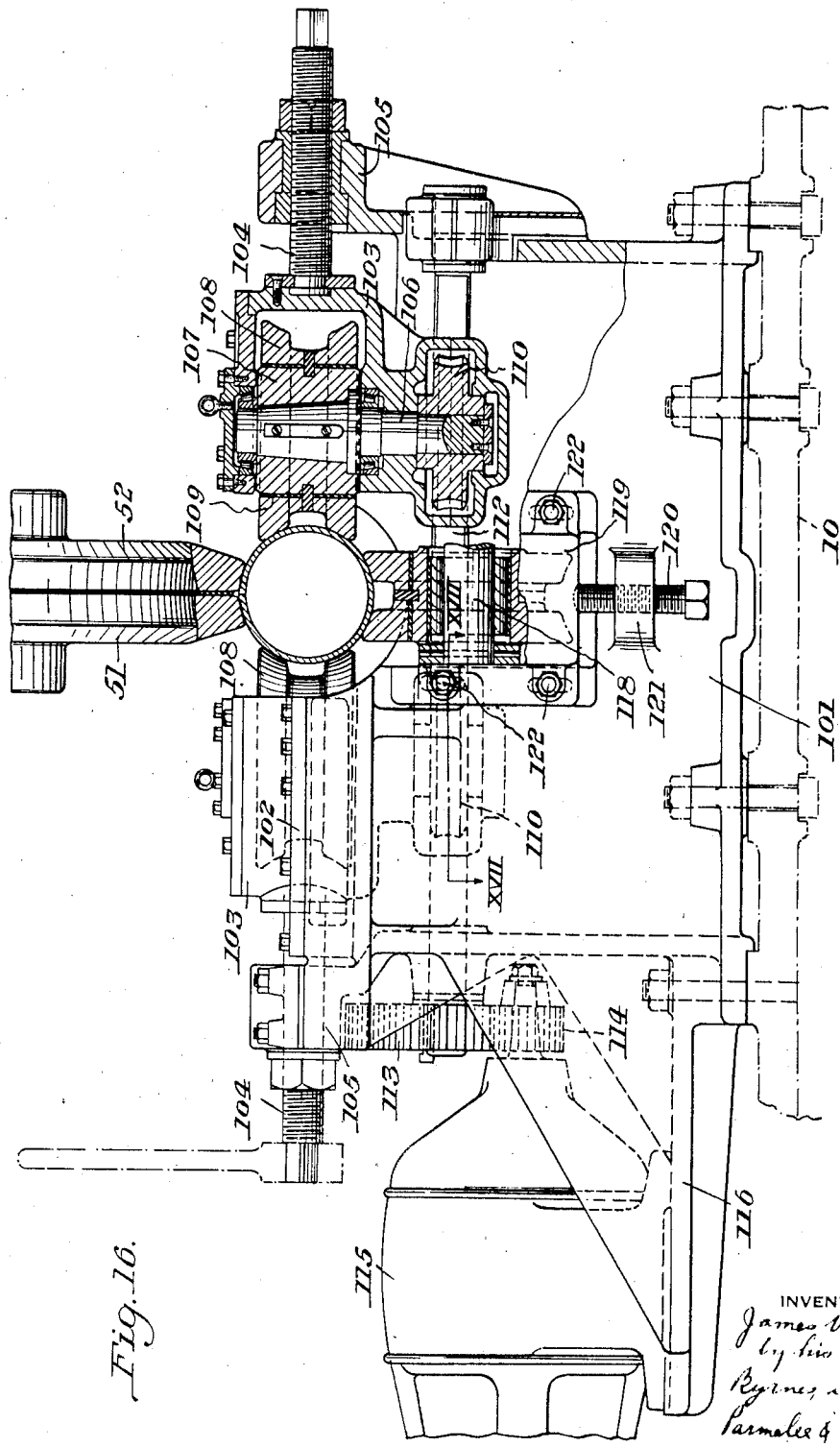

Nov. 28, 1939.  J. V. CAPUTO  2,181,652
ELECTRIC WELDING MACHINE
Filed Aug. 14, 1930   12 Sheets-Sheet 12
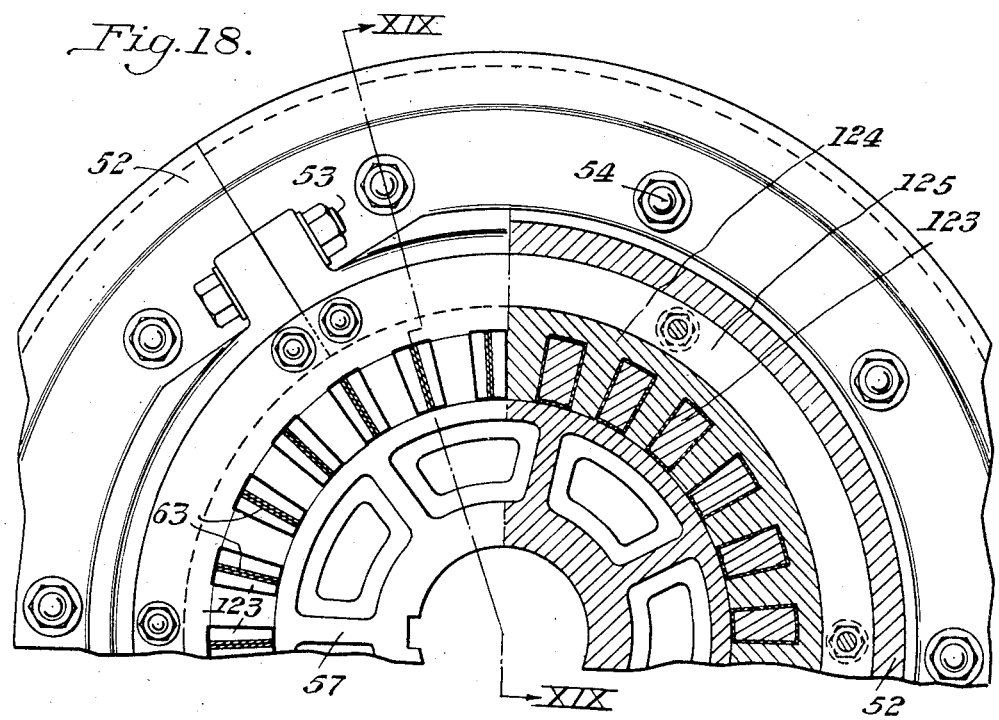
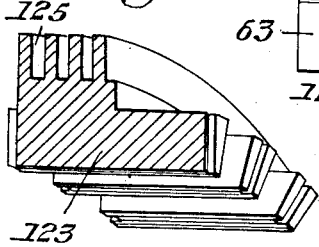
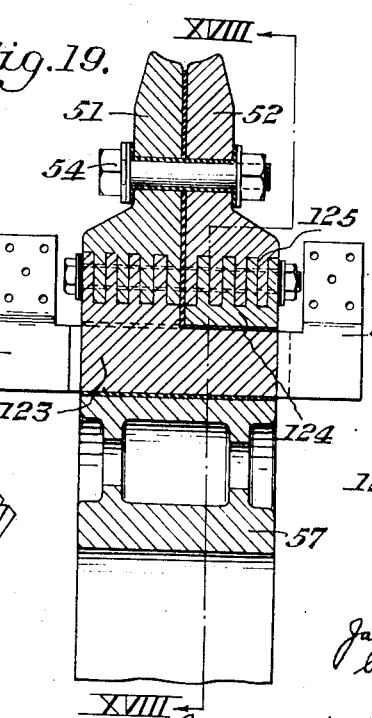
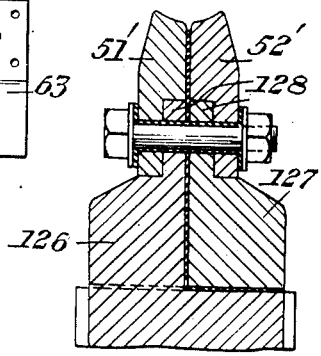
INVENTOR
James V. Caputo
by his attorneys
Byrnes, Stebbins, Parmelee & Blenko Patented Nov. 28, 1939

2,181,652

UNITED STATES PATENT OFFICE 2,181,652

ELECTRIC WELDING MACHINE

James V. Caputo, Crafton, Pa.

Application August 14, 1930, Serial No. 475,174

50 Claims. (Cl. 219—6)

My invention relates to electric welding and, in particular, to a method and apparatus for welding together the edges of an axial seam-cleft in a cylindrical pipe length formed from a flat piece of skelp.

Numerous methods and devices for continuously welding tube by electric current have been suggested heretofore. The majority of these, however, have been concerned with the manufacture of small tube from thin gauge material. Such tube is utilized for purposes which do not require that the same be fluid tight or even continuously welded.

It would be desirable, of course, to take advantage of the methods now practiced for making small thin gauge tube, in the manufacture of large size pipe adapted for the transmission of fluids. The advantages of the continuous process are the high speed of production and the low unit cost. The difficulties in the way of such procedure, however, have prevented it from being carried out. One of the chief difficulties experienced is in supplying the welding current to the opposite edges of the seam to be welded. In most of the machines of the prior art, alternating current from a stationary transformer is supplied through a sliding connection to an electrode roll making continuous contact with the seam.

While such arrangement is fairly satisfactory for thin gauge tubing where the welding currents are comparatively small, serious objections appear when it is attempted to use similar apparatus to weld heavy wall pipe. Obviously, the welding currents for such pipe are much greater than those for thin gauge tube and the considerable losses which have been involved in the manufacture of the latter, due to the reactance and resistance of the leads and contacts traversed by the welding current, would be multiplied so that the efficiency of the system would be very low.

The prior art, as evidenced by the patents to Fulda No. 1,199,537 and Snodgrass No. 1,478,262, contain suggestions for elimination of these losses. The substance of the suggestions is the use of a rotatable transformer which revolves with the electrode roll and has short, rigid connections thereto for transmitting the welding current. A great portion of the losses involved in the long leads and sliding connections of the stationary transformer devices is thus eliminated. The apparatus disclosed in the patents referred to, however, is not suited for actual use because it is not practical to construct and use the elements shown and described. This apparatus is difficult and expensive of construction and does not take into account the various practical problems met with in handling large size pipe requiring very high welding current.

The present invention utilizes the rotatable transformer suggested in the prior art, but in a form different from anything of the kind of which I am aware. The construction to be described takes full account of all of the practical difficulties which might be anticipated in the manufacture of electrically welded pipe. It has been devised also with regard for the mechanical and electrical principles involved and is correct in theory and construction.

In accordance with the invention, I provide a welder including a supporting base. Columns are secured to the base and support a head or cap member thereabove. A carriage is slidably suspended between the columns from the head. The suspension includes compression springs which afford a resilient support for the carriage. The carriage comprises a pair of bearing housings in which a shaft is journaled. A plurality of step-down transformers are secured to the shaft in two symmetrically arranged groups, one positioned adjacent either end of the shaft. Between the two groups of transformers, a pair of electrode rolls are positioned. The electrodes are of large diameter and, preferably, of greater diameter than the transformer groups. Short and rigid connections extend from the transformers to the electrode rolls. Since the rolls and transformers rotate together, there is no sliding contact therebetween but an electrically secure and low resistance path. These connections limit the losses between the transformer and the edges of the pipe seam to a minimum. Since the shaft is vertically adjustable, the desired contact pressure may be brought to bear on the pipe being welded. The transformers employed closely approach standard designs so that the cost thereof is kept down. A novel form of cooling mechanism is provided for preventing the transformers and rolls from attaining excessive temperatures. The invention is well adapted for the manufacture of large size, heavy wall pipe of different sizes. The pipe handling devices, including novel forms of feed rolls and pressure rolls, as well as the electrode rolls, can be changed to handle various pipe sizes. The novel features of the invention to be described in greater detail hereinafter and set forth specifically in the claims, largely eliminate the difficulties experienced with the machines of the prior art and overcome the objections to the use of the principles thereof for the manufacture of pipe in the large sizes and greater wall thickness.

For a complete understanding of the invention, reference is made to the accompanying drawings. In the drawings—

Figure 2 is a side elevation thereof;

Figure 3 is a view partly in section and partly in elevation along the line III—III of Figure 2;

Figure 4 is a sectional view along the line IV—IV of Figure 3;

Figure 5 is a top plan view of the machine partly in section;

Figure 6 is a sectional view thereof with parts in elevation taken along the line VI—VI of Figure 1;

Figure 7 is a sectional view showing the appearance of sections taken along the lines VIIa—VIIa, VIIb—VIIb and VIIc—VIIc of Figure 6;

Figure 8 is a sectional view through the electrode rolls along the line VIII—VIII of Figure 7 with parts omitted for the sake of clearness;

Figure 11 is an end elevation of the transformer assembly showing cooling mechanism applied thereto;

Figure 12 is a sectional view along the line XII—XII of Figure 11;

Figure 13 is a side elevation of the feed rolls;

Figure 14 is an end elevation thereof;

Figure 15 is a sectional view along the line XV—XV of Figure 14;

Figure 16 is a side elevation partly broken away showing one of the pressure rolls and the supporting roll in section.

Figure 18 is a sectional view similar to Figure 7 showing a modified form of construction;

Figure 19 is a sectional view taken along the line XIX—XIX of Figure 18;

Figure 20 is a detail view showing the construction of a portion of the modified form, and Figure 21 is a view similar to Figure 19 illustrating a still further modified form.

Figure 1:
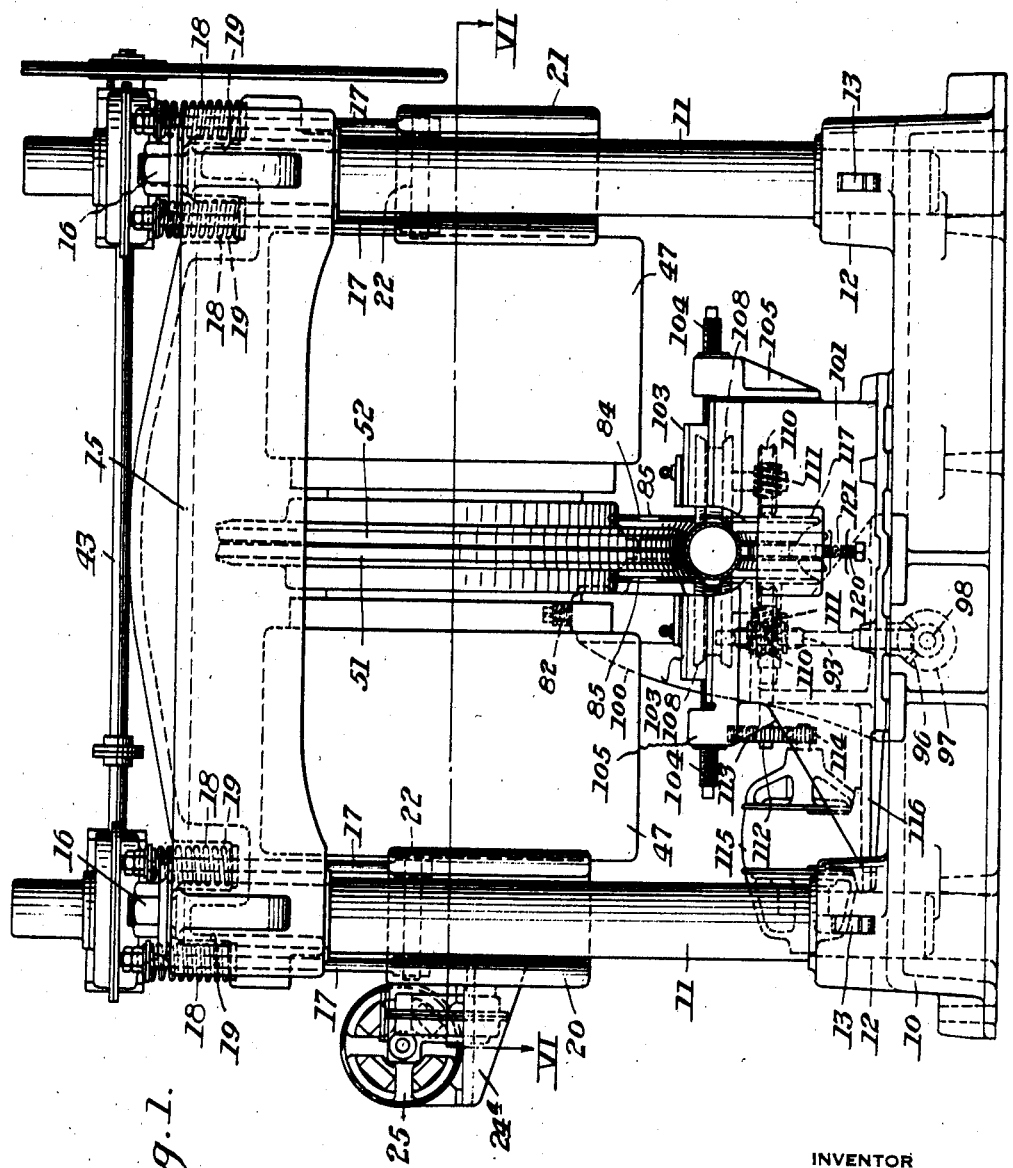
Figure 1 is an end elevation of the welding machine.

Referring in detail to the drawings and in particular to Figures 1 and 2, the welding machine comprises a base 10 which is supported on any suitable foundation. The base is rectangular in plan and at each corner thereof, a column 11 is seated in a socket 12 to which it is secured by a pin 13. The upper ends of the columns are reduced at 14 and a head casting or cap member 15 is supported thereon. Nuts 16 cooperate with the threaded reduced ends of the column to secure the head in position.

Adjacent each column, the head 15 is provided with a pair of suspension rods 17 which traverse the coils of a compression spring 18 seated in suitable recesses 19 in the head. At their lower ends, the suspension rods 17 are pinned to bearing housings 20 and 21 by pins 22. The ends of the castings forming the bearing housings are formed to fit around the columns 11 for sliding engagement therewith, as shown more particularly in Figure 6.

A shaft 23 (see Figures 3 and 6) is journaled in suitable bearings 24 received within the housings 20 and 21. The housing 20 has a laterally extending platform 24a on which a motor 25 is supported. The housing 20, as well as providing journal bearings for the shaft 23, provides bearings for a worm shaft 26 having a worm 26' thereon, and a worm shaft 27. The shaft 26 is coupled to the shaft of the motor 25. The shaft 27 carries a worm wheel 28 meshing with the worm 26' and also a worm 29. The worm 29 cooperates with a worm wheel 30. The worm wheel 30 is keyed to a stub shaft 31 journaled in the housing 20 having a squared end 32 for driving a slip clutch 33 received in a bore 34 in the end of the shaft 23. The slip clutch 33 is of the pin or roller type and comprises a grip sleeve 33a secured within the bore 34, and a cruciform member 35a. Spring pressed pins or rollers 36 are carried by the member 35a for frictionally engaging the sleeve 33a when the shaft 31 is rotated in a clockwise direction, as viewed in Figure 4. If the shaft 31 is rotated in the opposite direction, or if the shaft 23 is turned faster than the shaft 31, the clutch 33 permits relative slippage to occur. The slip clutch 33 thus effects a positive drive of the shaft 23 in a clockwise direction but permits it to over-run if otherwise driven at a faster rate.

The vertical adjustment of the housings 20 and 21 is effected by the means shown in Figures 1, 2 and 5. This means includes a pair of screws 35 swivelled to the bearing housings at 36a. The screws 35 traverse threaded bushings 37 secured within sleeves 38 formed integral with the head 15. The upper ends of the screws 35 are squared at 39 to form a sliding connection with worm wheels 40. These worm wheels are enclosed in housings 41 and mesh with worms 42 keyed to a transverse shaft 43. The shaft 43 is journaled in bearings 44 carried by the housings 41. A hand wheel 45 is provided for turning the shaft 43, but any other convenient means, such as a motor, may be employed instead.

When the shaft 43 is rotated, the screws 35 are turned by the worm wheels 40 and the worms 42. The rotation of the screws causes them to be raised or lowered. The bearing housings 20 and 21 may thus be lowered against the supporting frame of the compression springs 18. If it is desired to raise the bearing housings, proper rotation of the screws will permit the springs to accomplish this result. By means of this construction, the weight of the shaft, bearing housings and apparatus supported thereon is resiliently supported by the springs 18. If it is desired to cause the apparatus on the shaft to exert a positive downward pressure, it is only necessary to adjust the screws 35 to the desired extent. No weight is supported by the adjusting screws and little effort is therefore required to turn them. At the same time, any desired pressure can be exerted on the bearing housings.

Figure 9:
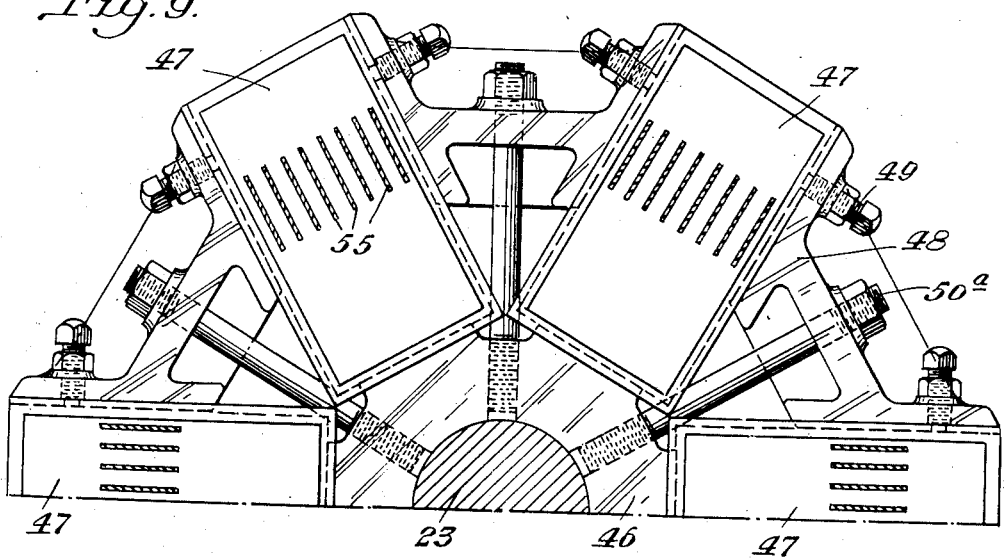
Figure 9 is a sectional view along the line IX—IX of Figure 6 showing the arrangement of the transformers.

Referring to Figure 6, the shaft 23 is provided with spiders 46 keyed thereon. A plurality of stepdown transformers 47 are seated on the spiders and may be keyed thereto, as shown in Figures 6 and 9. Clamping wedges 48 grip the transformers by means of set screws 49. Threaded studs 50a projecting from the spiders 46 permit the wedges 48 to be drawn tight against the transformers. The transformers 47 are of substantially standard design and are enclosed in sheet steel cases. As appears in Figures 6 and 9, the transformers are arranged on the spider 46 in two symmetrical groups.

The primary windings of the transformers 47 in each group are adapted to be connected in series. This causes the total load to be divided substantially equally between the several transformers even though the load is concentrated substantially at one point on the periphery of the electrode. High voltage current is supplied to the windings in series through slip rings 50 carried on the shaft 23. These slip rings are suitably insulated and shielded to prevent flashover. In order to supply the large current required for welding large size, heavy wall pipe, I connect the secondary windings of the transformers in parallel to electrode rolls 51 and 52. These rolls are insulated from each other, one of said rolls being grounded to the frame of the machine, and each roll is split diametrically, as shown in Figure 7, for ease in removal. The halves of each roll are bolted together by bolts 53 and the two rolls are secured together by bolts 54 passing through slip insulating bushings. The rolls 51 and 52 are grooved around their periphery for cooperating with any definite size of pipe to be welded.

The secondary terminals of the transformers project from the casings thereof at 55, terminals of opposite polarity being disposed adjacent one another. Each transformer has a plurality of secondary windings and the terminals of each winding are brought out separately. In order to reduce the losses resulting from lengthy circuits between the transformer and electrode rolls, I connect the secondary terminals of the transformers alternately to segments 56 disposed within the rolls 51 and 52 and supported on a spider 57 secured to the shaft 23. Alternate segments are insulated from the spider, the uninsulated segments being seated directly thereon so as to be in electrical connection therewith and ground one of the electrode rolls 51, 52.

Each segment 56 has a high portion 58 and a low portion 59, as shown in Figure 7. Alternate segments are insulated from each other and have their high and low sections reversed. Each segment thus has an end exposed at either side of the spider 57. I insert a conducting filler block 60 into the recess between the high portions of alternate segments and above the low portion of the segment therebetween. The segments and filler blocks are welded together at 61 and thus form a pair of rigid, continuous drums with the low portions 59 of the segments of one drum fitting into the space between alternate high portions of the other drum and the filler block welded thereto. The segments are assembled to form the two insulated drums and are then shrunk on to the spider 57.

The periphery of the drums is grooved at 62. The inside of the electrode rolls 51 and 52 is similarly grooved to seat firmly on the drums. By this construction, the rolls 51 and 52, or either one of them, may be removed from the drums and replaced very quickly in case the rolls are worn, or in the event that the size of the pipe being welded is to be changed.

The connections between the secondary terminals 55 of the transformers and the segments of the drums are L-shaped copper straps 63. As shown in Figure 8, one of these straps is welded to the ends of each segment in the drums. The ends of the segments may be slotted for receiving the lower ends of the straps. The upper ends of the straps are drilled and bolted to the terminals 55. It will be apparent that corresponding terminals of transformers on opposite sides of the electrode rolls are connected to the same segments, terminals of like polarity being connected to a common segment. As appears more clearly from Figure 7, the strap 63 may be formed of double thickness and the two thicknesses separated for surrounding the terminals 55. By designing the electrode of large diameter, certain beneficial results are produced. As illustrated, the electrode is of greater diameter than the transformer groups and is of a diameter several times that of the pipe being welded. This construction causes the weld which is produced to be of a continuous rather than intermittent character. Heretofore, small electrodes have been employed in electric welding and comparatively thin stock has been used. It is known that, by manipulating the speed of travel of the stock or the frequency, the spacing of individual welds effected by successive current alternations can be varied. This is because the individual welds are effected by single current alternations. The heat capacity of the stock is not sufficient to store welding heat or transmit it between welds, because of the thinness of the material and the great surface exposed to radiation. The use of small electrodes also contributes to this result, since the actual area of contact between the electrode and the tube approaches very nearly the theoretical line contact.

According to my invention, I form a continuous weld in heavy wall tubing by increasing the size of the electrode so that the area of contact is much greater than in the case of a small electrode. The size of the electrode is determined so that, at the desired speed of travel of the stock, each point on the seam will be traversed by several current alternations before passing out of the zone of contact. It thus happens that repeated alternations traversing the same point on the seam effect a continuous weld. The greater heat capacity of the heavy wall tube, furthermore, contributes to this result. The entire length of the seam is raised to welding temperature, as there is not sufficient exposed surface to cool the seam below the welding point between successive alternations. This fact, added to the fact that each point on the seam is traversed by a plurality of current alternations produces a continuous weld along the seam. No intermittent character in the weld can be observed by an ordinary inspection or microscopic means. By increasing the electrode pressure, a still greater area of the contact zone may be obtained.

Figure 10:
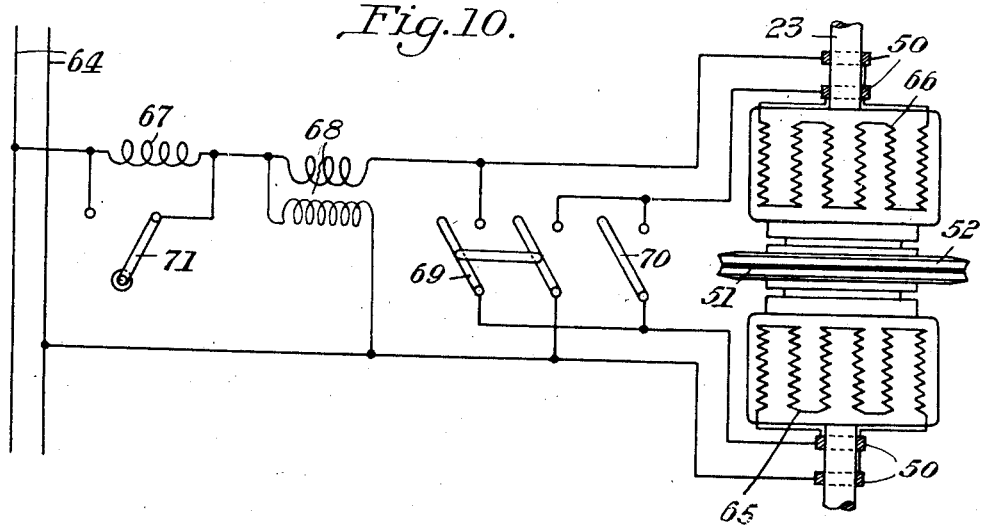
Figure 10 is a circuit diagram of the electrical connections.

Figure 10 illustrates diagrammatically the circuit which I prefer to employ for controlling the transformer. A high voltage supply circuit 64 is adapted to supply current to the primary windings 65 and 66 of the two groups of transformers on the shaft 23 through the slip rings 50. In order to provide a maximum flexibility of control for the welding current, I employ a reactor 67, a voltage regulator 68, and control switches 69 and 70. As will be apparent from Figure 10, the primary windings of the transformers in each group are connected in series. The switches 69 and 70 make it possible to connect the two groups of transformers in series or in parallel. The voltage regulator is a single phase induction regulator which is capable of raising or lowering the voltage across the transformer windings. The reactor 67 and its shunting switch 71 provide means for further varying the applied voltage. For a minimum secondary voltage or voltage between electrode rolls, the switch 69 is open and the switch 70 is closed. The primary windings of the transformers are then included in a single series circuit. The voltage regulator should be in position for maximum bucking effect. For a still lower voltage, however, the switch 71 may be opened to insert the reactor in the circuit. If a higher voltage is desired, the regulator may be shifted to decrease its bucking effect. A still higher voltage may be obtained by adjusting the regulator for boosting the applied voltage.

If a higher voltage still is desired, the switch 70 should be opened and the switch 69 closed. This operation connects the two groups of transformer windings in parallel across the circuit 64. The reactor 67 and the regulator 68 may be employed as in case of a series connection for obtaining a plurality of secondary voltages.

Figures 11 and 12 illustrate means for cooling the transformers and electrode rolls. An air supply pipe 72 is adapted to supply clean, cool air to an annular duct 73 supported on the bearing housing 20 between the columns 11 and the transformers 47. The duct is open on the side adjacent the transformers, the casings of which have openings 75 communicating with the duct. Between transformers, baffle plates 74 close the open side of the duct 73. The air supplied through the pipe 72 thus passes through the duct 73 and enters the transformer casings through the holes 75. The air passes over the windings of the transformers 47 and strikes the electrode rolls 51 and 52. A similar arrangement is provided at the other end of the shaft 23 for cooling the transformers and electrode roll adjacent the other end of the shaft. As the result of this construction, a plurality of axial streams of cool air meet at the electrode rolls and, after passing thereover, pass into the atmosphere abstracting the excess heat of the transformers and electrode rolls. Figure 11 also shows conduits 76 for receiving connections between primary windings of adjacent transformers. These connections are extended to the slip rings 50 through leads 77.

The novel form of feed rolls which I contemplate using in connection with the welding machine already described is illustrated in Figures 13 through 15. These feed rolls comprise a frame 78 adapted to be secured to the base 10 of the machine. The frame is equipped with vertical guides 79 and 80. A bearing block 81 is slidable in the guides 79. A screw 82 is threaded through the top of the frame and is swiveled to the block 81. The block 81 carries journal bearings for a roll shaft 83. The shaft 83 carries a roll 84 having separate ends and a central disc 86. The ends 85 and disc 86 of the roll 84 are clamped between a shoulder 87 on the shaft 83 and a clamping nut 88 threaded on an end of the shaft. By means of the screw 82 the bearing block 81 and the roll 84 may be shifted vertically. By means of the nut 88, the roll 84 may be changed or renewed very quickly.

A bearing block 89 is gibbed to the guides 80 by the gibs 90. The block 89 is adjustably supported in the guides by a screw 91 threaded in the base of the frame 78. By means of the screws 82 and 91, the feed rolls 84 and 99 may be caused to advance the blank into the welder at the proper elevation with respect to the electrode and the pressure rolls.

A shaft 92 is journaled in the block 89. A worm wheel 93 is connected to the shaft 92 through a slip clutch 93a similar to that described for the shaft 23. The worm wheel 93 meshes with a worm 94 slidably mounted on a squared shaft 95. The worm wheel 93 and worm 94 are enclosed within the bearing block 89 and move therewith. The shaft 95 carries a bevel gear 96 which meshes with a bevel gear 97 on a shaft 98 journaled in the base 10 of the welding machine. The shaft 98 may be driven by any suitable means, for example, a motor 98a and connecting gearing.

The shaft 92 carries a roll 99 similar to the roll 84 except that it is not provided with a central disc having a fin as is the roll 84. The function of the disc 86 in the roll 84, of course, is to enter the seam-cleft in the formed pipe and guide the latter under the welding electrodes 51 and 52. The central disc of either roll of the feeding stand may be replaced by a thinner disc as the ends 85 and 99 wear, to preserve continuous contact thereof with the blanks.

The feed roll stand just described is positioned at the entrance end of the welding machine, as will be apparent from Figure 2. A similar stand of feed rolls 100 is positioned on the exit side of the welding machine to receive the welded pipe and pass it on to a delivery table. The upper roll of the stand 100 obviously requires no central disc as is the case with that of the stand 78. Formed pipe is guided into the feed rolls at the entrance side by any suitable means (not shown).

Figure 17:
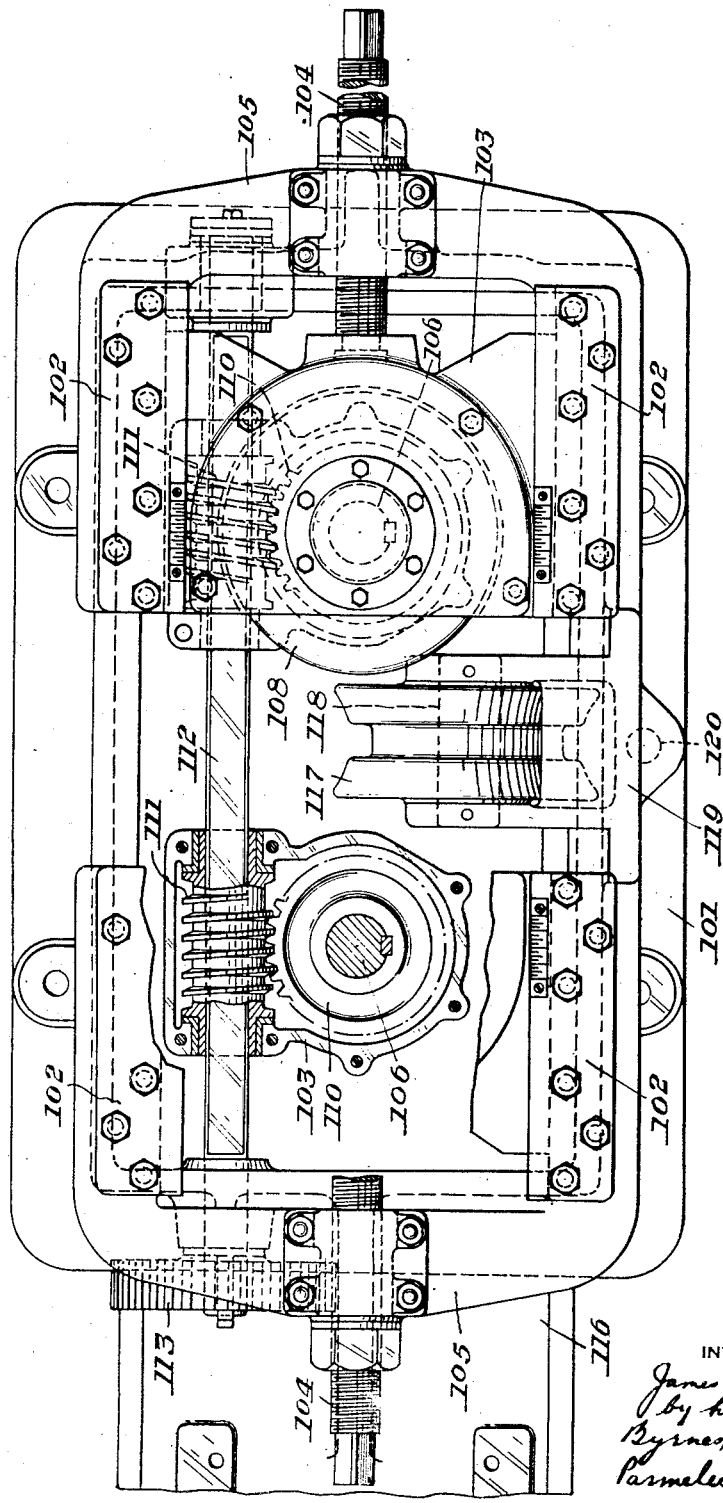
Figure 17 is a top plan view of the pressure rolls, partly in section taken along the line XVII—XVII of Figure 16.

The formed pipe received by the entrance feed rolls is directed beneath the welding electrodes 51 and 52 and between pressure rolls which are illustrated in Figures 16 and 17. The pressure roll mechanism includes a frame 101 secured to the base 10 of the welding machine. Adjacent the top of the frame, guides 102 are provided for roll housings 103 which are gibbed therein. Screws 104 are swiveled to the housings and traverse threaded sleeves carried by extensions 105 on the frame. The housings may be adjusted laterally by turning the screws 104.

In each housing 103, a vertical roll shaft 106 is journaled. The upper end of the shaft 106 is tapered for receiving a roll core 107. The periphery of the roll is constituted by a ring 108 separated from the core by an insulating bushing 109. On the lower end of the shaft 106, a worm wheel 110 is keyed. The worm wheel 110 is enclosed in the housing 103 and meshes with a worm 111 rotatably carried in and enclosed by the housing. The worms 111 are slidable on the square shaft 112 journaled in the frame 101. A gear 113 is keyed to the shaft 112 and meshes with a pinion 114 on the shaft of a motor 115. The motor 115 rests on a platform 116 carried by the frame 101.

In addition to the side rolls carried in the housings 103, a supporting roll 117 is provided. The roll 117 is journaled on a horizontal shaft 118 and includes a core and peripheral ring separated by an insulating bushing, as already described in connection with the side rolls. The shaft 118 is carried in a vertically adjustable housing 119. An adjusting screw 120 passing through a threaded lug 121 on the frame affords means for adjusting the housing, and clamping bolts 122 permit it to be clamped in adjusted position.

The roll 117 serves generally to oppose and sustain the downward force exerted on the pipe by the electrode. Since the axis of the roll 117 is displaced from that of the electrode, along the path of travel of the blank, however, a blank advancing toward the electrode may be slightly deformed or bent around the latter after engagement therewith.

It will be apparent that the welding rolls are easily adjustable and that the rolls can be changed for different sizes of pipe with a minimum of delay. The portion of each roll contacting with the pipe being welded is insulated from the frame and other supporting members so that all leakage currents are eliminated.

Referring now to Figures 18 and 19, a modified form of supporting and connecting means for the electrode rolls 51 and 52 includes a pair of annular castings having alternating projections or fingers and recesses which interfit and, when pressed together and insulated from each other, form a rigid continuous drum for carrying the electrode rolls. The castings are indicated by the numerals 123 and 124. The resulting construction is very similar to that already described in connection with Figures 7 and 8, except that the conducting drums supporting electrode rolls are cast in one piece instead of built up from segments welded together. When the castings 123 and 124 have been assembled they are grooved at 125 for receiving correspondingly grooved inner surfaces of the rolls 51 and 52. Figure 20 shows in detail how the castings are formed. The two castings are similar except that the fingers or lugs of each project oppositely and are adapted to lie within the recesses in the other casting.

A still further modified form of supporting drum is shown in Figure 21. According to this modification, castings 126 and 127 have interfitting portions and annular rims 128 to which the electrode rolls 51', 52', suitably recessed, are adapted to be bolted. It is obvious that the construction of the electrode rolls may be altered still further, but in any case, it is only necessary that connections be available to both electrode rolls on both sides of the combined unit. These connections may take the form of any suitably insulated interfitting portions, such as fingers, lugs, or tongues.

The invention described hereinabove represents a marked improvement over the prior art in that it provides means for welding large size, heavy wall pipe at comparatively high speeds. The weld effected is continuous and fluid-tight so that the pipe turned out may be employed in water, gas or oil lines. The device described is one that can be easily carried out in practice without any difficulty since the correct principles of electrical and mechanical design underlie the construction. By making the electrode rolls adjustable vertically, it is not only possible to accommodate different sizes of pipe but to exert different degrees of pressure on the seam being welded. The spring suspension of the electrode supporting carriage takes the weight of the latter off of the pipe seam but permits variation in welding pressure from a minimum to any desired value. The slip clutch in the drive for the electrode rolls permits the latter to turn at a higher speed than that at which they are driven in case the feed rolls run at a higher peripheral speed than the electrode rolls. The electrode rolls, being driven, are not subject to as much friction as if the engagement of the pipe therewith were relied on to turn the rolls. It is not necessary, therefore, to synchronize the drives for the electrode rolls and the feed rolls since any slight difference in speed will be taken care of by the slip clutches in the driving connection. The screw 120 permits the roll 117 to be adjusted to the desired elevation relative to the electrode and the feed rolls 84 and 99.

The advantages of placing the transformers on the shaft carrying the electrode rolls are obvious. The connections to the rolls are shortened and may be made permanent so that sliding connections are obviated together with the losses resultant therefrom. The transformers I employ are substantially standard in design so that no extra cost is entailed. One side of the secondary circuit of the transformer is grounded and the cost of the insulation eliminated thereby is avoided. The resistance of the circuit is likewise diminished, as well as the losses. The transformers are rigidly supported on the spiders by the clamps. The supply of high voltage current to the primary windings of the transformers involves no difficulties because the current is comparatively small. The electrode rolls proper are rigidly secured to their supporting drums and firmly connected therewith, although they may be easily removed for change and replacement. The rings provide a rigid support for the rolls, as well as serving to transmit the welding current thereto. It will be seen that the entire arrangement of transformers and electrode rolls is symmetrical so that there are no unbalanced loads on any of the frame or supporting members.

The cooling system provided prevents excessive temperatures being attained by the transformers or electrode rolls and increases the efficiency of operation. The circuit connections described permit a high degree of flexibility in operating the device under a wide range of different conditions.

The feed rolls are characterized by numerous advantages. In the first place, they serve to guide the pipe through the welding machine and assist the welding rolls in driving the pipe through. Since one end of the shafts for the feed rolls is free, the rolls can be changed with great facility. The slip clutch in the feed roll drive permits the rolls to over-run in case the welding rolls are driven at a faster rate.

The pressure rolls are adjustable to an unusual degree so that various sizes of pipe can be handled with a minimum of delay and difficulty. In addition, the pressure rolls are insulated from their supporting and driving mechanism so that leakage currents are prevented.

Although I have illustrated and described but a single present preferred embodiment of the invention with modifications of parts thereof, numerous changes in the construction shown may be made without departing from the spirit of the invention or the scope of the appended claims.

I claim:

1. In a welder, the combination with a base having columns thereon, of a head supported on said columns and a carriage suspended on springs from said head, consisting of bearing housings guided for vertical adjustment between said columns, a shaft journaled in said housings, transformers and electrode rolls secured to said shaft, a motor for driving said shaft and screwdowns for adjusting the housings.

2. A welder comprising a base, columns thereon, a head supported thereby and a pair of bearing housings slidably suspended between said columns by links having compression springs engaging the head, a shaft journaled in said housings, a motor supported on one housing for turning the shaft, transformers and electrode rolls secured thereto, screws for adjusting said housings on said columns and common actuating means for said screws.

3. In a welder, the combination with vertical columns and a carriage including bearing housings slidable thereon, of a shaft journaled in said carriage and carrying transformers and electrode rolls, of means for yieldingly urging the carriage upward, means for driving the shaft, and means for adjusting the carriage.

4. In a welder, the combination with a frame, a shaft yieldingly supported therein so as to be vertically adjustable, transformers arranged on the shaft in two groups, electrode rolls on the shaft between said groups, driving means for the shaft, and adjusting means therefor.

5. A welding device comprising a shaft, a plurality of independent transformers mounted on said shaft in two symmetrically disposed groups, a pair of electrode rolls surrounding said shaft between said groups, and a pair of drums having interfitting portions insulated from each other but in contact with said rolls respectively, and means including said portions for connecting one of the drums to all the terminals of all the transformer secondary windings having the same polarity and similar connecting means between the other drum and the terminals of opposite polarity.

6. In a welder, a pressure roll stand comprising a frame, side roll housings laterally slidable on the frame, a shaft carrying a roll and worm gear journaled in said housings, independent adjusting means therefor for at least one of said housings, and a vertically adjustable support roll housing on the frame and a roll journaled therein.

7. In a welder, a shaft, transformers carried by the shaft in two groups, cooling means therefor including annular ducts surrounding said shaft adjacent the ends thereof, and being open on the side adjacent said transformers, and means for supplying a cooling fluid to said ducts.

8. In a welder the combination with electrode rolls and feed rolls, and independent drive mechanisms therefor, of slip clutches in said drives whereby the rolls may over-run.

9. A welder comprising electrode rolls, a drive therefor, feed rolls, a drive therefor, and slip clutches in said drives to prevent friction on said rolls.

10. In a welder, electrode rolls, feed rolls, a driving mechanism therefor, and a slip clutch in the drive for at least one set of said rolls to prevent friction thereon.

11. In a welder, a shaft, electrode discs supported on said shaft side by side and insulated from each other, said discs having a plurality of openings and projections for interfitting cooperation, transformers mounted on said shaft on both sides of said discs, and connections from the secondary windings of the transformer including said projections.

12. In a welder, a shaft, a spider on the shaft, a plurality of transformers carried on said spider, wedges between said transformers, means for securing the wedges to the spider and means on the wedges engaging the transformers.

13. In combination with a welder comprising a plurality of transformers and electrode rolls mounted on a shaft for rotation therewith, means for constantly exerting an upward force on the shaft for carrying the weight thereof, screw means for varying the vertical position of the shaft, and common actuating means for the screw means.

14. In a welder, a transformer and electrode rolls mounted on a shaft for rotation therewith, a yielding support for upholding the weight thereof and means for adjusting the vertical position of the shaft, comprising a plurality of screw downs and common operating means therefor.

15. In a welder, the combination with a shaft, a plurality of transformers carried thereby, said transformers being arranged symmetrically in two groups, conducting drums axially alined on the shaft having alternate interfitting slots and lugs insulated from each other, the terminals of like polarity of one group of transformers being connected to one of said drums, the similar terminals of the other group being connected to the lugs of said one of said drums, and electrode rolls insulated from each other but in contact respectively with said drums.

16. In a welder, a pair of conducting annuli having interfitting slots and segments mounted on a shaft, transformers and electrode rolls on said shaft adapted to rotate therewith, and means for connecting the terminals of like polarity of said transformers to one of said annuli or to its fingers, said rolls being supported by and in contact with said annuli.

17. In a welder, a shaft, electrode rolls thereon, a pair of drums on the shaft supporting the rolls and having interfitting fingers, transformers on said shaft on both sides of said rolls, and connections from transformer terminals of like polarity on one side of the rolls to one of said drums, and connections from terminals of like polarity on the other side of the rolls to the fingers of said one of said drums which penetrates the other drum.

18. In a welder, a shaft, conducting drums having interfitting portions insulated from each other, transformers on said shaft on either side of said drums, and connections from the transformers on one side of the drums to the body of one of the drums and from the transformers on the other side to the interfitting portions of said one of said drums.

19. An electrode structure for a welder comprising a pair of conducting discs having interfitting portions, rings seated on said discs in conducting relation therewith, and electrical connections on both sides of said electrode secured to said portions.

20. An electrode structure for welding comprising axially aligned conducting discs, contact rings seated on said discs in conducting relation therewith, interfitting projections and openings on said discs, and electrical connections from both sides of said electrode secured to said projections.

21. In a continuous welding apparatus, the combination with rotatable electrodes, of means for feeding stock to be welded by current supplied through said electrodes, and means comprising an over-running clutch for driving said electrodes.

22. In a continuous welding apparatus, the combination with rotatable electrodes, of means for feeding stock to be welded by current supplied through said electrodes, and means for driving said electrodes, said last named means comprising a slip clutch whereby said electrodes may over-run.

23. A welding electrode comprising a pair of conducting discs disposed in side-by-side relation, and a plurality of connections extending through the electrode, said connections comprising a plurality of flat plates edge welded to one of said discs, both ends of said plates being adapted to receive a connection from a current supply source.

24. In a welder, the combination with a shaft, and electrode rolls mounted thereon, of means for yieldingly upholding the weight thereof, and means for adjusting the vertical position of the shaft comprising a plurality of screw-downs and common operating means therefor.

25. In a welding electrode, axially alined annular members separated by an intermediate layer of insulation, and terminals on at least one of said members projecting beyond said insulation and through another of said members but insulated from the latter.

26. In an electric welding apparatus, the combination with a disc electrode, transformers mounted adjacent the electrode in circumferentially spaced relation for rotation therewith, and connections between the transformers and the electrode including a plurality of conductors extending axially of the electrode, the electrode having a diameter greater than that of the spaced transformers, so that an extensive zone of contact with a work piece is provided whereby a plurality of current alternations traverse each point on the work.

27. In an electric welding apparatus, the combination with an electrode comprising a pair of juxtaposed discs, and circumferentially spaced transformers mounted on either side of the electrode for rotation therewith, of connections between said transformers and said discs including interleaved conductors of opposite instantaneous polarity, said electrode having a diameter greater than the spaced transformers whereby an extensive zone of contact with the work is provided to effect the welding of each point on the work by a plurality of current alternations.

28. In a welder, the combination with a base having columns thereon, of a head supported on said columns and a carriage suspended on springs from said head, consisting of bearing housings guided for vertical adjustment between said columns, welding means in said housings, a motor on said carriage for driving said welding means and screwdowns for adjusting the housings.

29. In a welder, a shaft, electrode discs supported on said shaft side by side, and insulated from each other, said discs having a plurality of openings and projections for inter-fitting co-operation, said discs having renewable rims, said rims and discs having radial surfaces contacting with one another, and bolts passing through the discs and rims, securing them in electrical contact, transformers mounted on said shaft on both sides of said discs, and connections from the secondary winding of the transformer including said projections.

30. In a welder, a shaft, electrode discs and transformers mounted thereon, a cooling fluid duct extending around the shaft, and having an open side adjacent said transformers, said open side being closed by a rotating manifold having a plurality of openings for admitting cooling fluid to the transformers, transformer connections and electrode.

31. In a welder, transformers mounted on a rotatable shaft, electrode discs between spaced transformer groups, a pair of fluid manifolds adjacent the transformers and rotatable therewith, a second pair of fluid manifolds cooperating with the first mentioned manifolds, and connected to a cooling fluid supply system.

32. In a welding electrode, the combination with a pair of annular members disposed side by side, said members having interpenetrating projections and recesses to provide terminals for both members on both sides of the assembled pair of members, said members being insulated from each other at all points, contact rings mounted on said members and insulated from each other, and means for supplying current to said annular members from both sides of the assembled pair of members.

33. A welding electrode comprising two annular members spaced side by side, said members having aligned projections and recesses, said projections extending through said recesses, said members being insulated from each other at all points, and means for supplying current to both said members from either side of the assembled pair of members.

34. A welding electrode comprising a pair of discs seated side by side, contact rings mounted on said discs, each of said discs having alternating openings and projections, the projections on one disc extending through the openings of the other, and current-supply connections extending to each of said discs or the projections therefrom, from both sides of the electrode.

35. The combination with a welder electrode comprising a pair of conducting discs having interfitting portions, of energy supply means on opposite sides of said electrode including connections on opposite sides of the electrode secured to said portions.

36. A pipe-welding device including a pair of spaced cooperating annular electrodes and a pair of opposed spaced rotatably mounted transformers, an electrode-supporting and current-conducting structure including a pair of opposed metal discs having flat axial surface engagement with the respective annular electrodes, electric-insulating material between the metal discs and between the annular electrodes, clamping bolts extending laterally through the annular electrodes and the metal discs, a plurality of interfitting projections extending in alternately opposite directions integral with said metal discs, each projection having a supporting and electric-conducting relation with one metal disc, and electric-conducting connections between the projection and terminals of similar polarity on the pair of transformers.

37. In a welding apparatus, the combination with a source of welding current, a rotatably mounted welding electrode, connections therebetween adapted to carry the full welding current, said connections including a plurality of separate conductors spaced circumferentially about a common axis, extending parallel thereto and connected to said source, and radial extensions from said conductors connected to the welding electrode, and means supporting said conductors for rotation with said electrode.

38. In a pipe-welding device for butt-welding tubes, an electrode for supplying current to both edges of a seam cleft in a formed pipe blank, a pair of vertical rolls for squeezing together the seam edges, and an independent horizontal support roll displaced longitudinally of the axial plane of said electrode and vertical rolls, for supporting the blank against vertical pressure exerted thereon by said electrode, there being no supporting roll for making contact with the blank at the vertical axial plane through the electrode.

39. Pipe welding apparatus including a roll pass, at least one of the rolls of said pass comprising a pair of substantially identical opposed members with curved external peripheries adapted to engage a pipe exteriorly, and an annular disc therebetween, a spindle, and means supporting said spindle, said members and disc being removably mounted on said spindle, the inner periphery of said disc being disposed between said members and effective to space them apart, the disc having a centrally disposed fin of reduced thickness adapted to enter the cleft between the edges of a formed pipe blank being welded.

40. The combination with a welding electrode, and a frame on which it is supported for rotation, of a pressure-roll stand comprising an auxiliary frame mounted within said first-mentioned frame, vertical side pressure rolls mounted in housings independently adjustable transversely of said auxiliary frame, a shaft having driving connections with said rolls extending across said auxiliary frame on one side of said rolls, and a horizontal support roll journaled in said auxiliary frame below said side pressure rolls with its axis on the opposite side of the plane determined by the axes of said side pressure rolls, from said shaft.

41. Apparatus for butt welding comprising means for feeding into a welding throat a ferrous metal blank having a longitudinal open seam, means for welding the abutting edges of the tubular blank, means including rolls for applying a pressure to the outer walls of the tubular blank through a vertical plane adjacent the center line of the electrodes, and means comprising a roll for counteracting the downward pressure of said welding means, the center line of said roll being on the entrance side of the vertical plane through the axis of the electrodes, there being no supporting roll for making contact with the blank at the vertical axial plane through the electrode.

42. Pipe welding apparatus including a roll pass, at least one of the rolls of said pass comprising a pair of opposed members with curved external peripheries adapted to engage a pipe exteriorly, a spindle extending through the members for supporting them coaxially in spaced relation, and removable spacing means between said members, said means being so dimensioned as to be wholly outside said blank.

43. In a welder, a rotatable shaft, a transformer mounted thereon, electrodes rotating with said transformer and connected thereto, and an annular duct extending around the axis of said shaft at one side of said transformer, said duct being open on the side adjacent said transformer.

44. In a welder, a rotatable shaft, a transformer mounted thereon, electrodes rotating with said transformer and connected thereto, an annular duct extending around the axis of said shaft at one side of said transformer, said duct being open on the side adjacent said transformer, and means rotating with said transformer for confining cooling fluid supplied through said duct to predetermined paths.

45. In a welder, a rotatable shaft, a plurality of transformers mounted thereon, electrodes rotating with said transformers and connected thereto, an annular duct extending around the axis of said shaft on one side of said transformers, said duct being open on the side adjacent said transformers, and baffle plates between said transformers overlying said open side.

46. In an electric welder, a rotary annular electrode adapted to engage a pipe blank moving longitudinally, side pressure rolls and a support roll defining with said electrode a welding throat through which the blank passes, said support roll being offset from the plane normal to the blank axis and including the axis of said electrode, there being no support roll for making contact with the blank at said plane.

47. In a pipe welder, a feed roll stand comprising a pair of cooperating rolls, each of said rolls being composed of a supporting spindle, a pair of oppositely disposed end members thereon having curved peripheral surfaces adapted to engage a pipe exteriorly, and means removably disposed between said members effective to hold them in predetermined spaced relation.

48. Pipe welding apparatus including a roll pass, at least one of the rolls of said pass comprising a pair of opposed members with curved external peripheries adapted to engage a pipe exteriorly, a spacer ring mounted therebetween, and a centrally disposed fin of reduced thickness on said ring adapted to enter a cleft between adjacent longitudinal edges of a formed pipe blank, a spindle, and means supporting said spindle, said members, ring, and fin being removably mounted on said spindle, whereby said one of said rolls may be adjusted when worn by substituting a ring of different thickness.

49. In a welder, the combination with a base having columns thereon, of a head supported on said columns, a carriage slidable on said columns, said carriage including bearing housings, welding means journaled in said housings, a motor on said carriage for driving said welding means, means constantly exerting an upward force on the carriage, and screw-downs on said head for adjusting the carriage downwardly against said force.

50. In a welder, the combination with a base having columns thereon, of a head supported on said columns, a carriage slidable on said columns, said carriage including bearing housings, welding means journaled in said housings, means constantly exerting an upward force on the carriage, and means on said head for adjusting the carriage downwardly against said force.

JAMES V. CAPUTO.

CERTIFICATE OF CORRECTION.

Patent No. 2,181,652.   November 28, 1939.

JAMES V. CAPUTO.

It is hereby certified that error appears in the printed specification of the above numbered patent requiring correction as follows: Page 6, second column, line 19, claim 16, for the word "fingers" read segments; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.